(12) United States Patent
Trubnikov et al.

(10) Patent No.: US 12,460,096 B2
(45) Date of Patent: Nov. 4, 2025

(54) OVER-PRINT VARNISH FORMULATION

(71) Applicant: HEWLETT-PACKARD DEVELOPMENT COMPANY, L.P., Spring, TX (US)

(72) Inventors: Alex Trubnikov, Netanya (IL); Mazi Bar, Netanya (IL); Eytan Cohen, Netanya (IL); Kfir Dar, Netanya (IL); Kobi Cohen, Netanya (IL)

(73) Assignee: Hewlett-Packard Development Company, L.P., Spring, TX (US)

( * ) Notice: Subject to any disclaimer, the term of this patent is extended or adjusted under 35 U.S.C. 154(b) by 431 days.

(21) Appl. No.: 17/911,397

(22) PCT Filed: Apr. 2, 2020

(86) PCT No.: PCT/US2020/026438
§ 371 (c)(1),
(2) Date: Sep. 13, 2022

(87) PCT Pub. No.: WO2021/201872
PCT Pub. Date: Oct. 7, 2021

(65) Prior Publication Data
US 2023/0104817 A1 Apr. 6, 2023

(51) Int. Cl.
| | | |
|---|---|---|
| *C09D 11/30* | (2014.01) | |
| *B41M 5/00* | (2006.01) | |
| *B41M 7/00* | (2006.01) | |
| *B42D 15/00* | (2006.01) | |
| *C09D 11/033* | (2014.01) | |
| *C09D 11/102* | (2014.01) | |
| *C09D 11/106* | (2014.01) | |
| *C09D 11/12* | (2006.01) | |
| *C09D 11/38* | (2014.01) | |
| *C09D 11/40* | (2014.01) | |
| *C09D 11/54* | (2014.01) | |
| *C09D 175/04* | (2006.01) | |

(52) U.S. Cl.
CPC .......... *C09D 11/30* (2013.01); *B41M 5/0017* (2013.01); *B41M 7/0054* (2013.01); *B42D 15/0093* (2013.01); *C09D 11/033* (2013.01); *C09D 11/102* (2013.01); *C09D 11/106* (2013.01); *C09D 11/12* (2013.01); *C09D 11/38* (2013.01); *C09D 11/40* (2013.01); *C09D 11/54* (2013.01); *C09D 175/04* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033
See application file for complete search history.

(56) References Cited

U.S. PATENT DOCUMENTS

| | | | |
|---|---|---|---|
| 6,443,568 B1 * | 9/2002 | Askeland | B41J 2/2114 347/100 |
| 9,278,515 B2 | 3/2016 | Sarkisian et al. | |
| 2003/0018119 A1 * | 1/2003 | Frenkel | C09D 11/326 524/502 |
| 2006/0238592 A1 * | 10/2006 | Kadomatsu | B41J 2/2114 347/100 |
| 2008/0014378 A1 * | 1/2008 | Hoffmuller | B42D 25/29 428/29 |

(Continued)

FOREIGN PATENT DOCUMENTS

| | | |
|---|---|---|
| EP | 2657308 A1 | 10/2013 |
| JP | 2004-143356 A | 5/2004 |

(Continued)

*Primary Examiner* — Manish S Shah
(74) *Attorney, Agent, or Firm* — Dierker & Kavanaugh, P.C.

(57) ABSTRACT

An over-print varnish formulation is described. The formulation comprises a non-ionic polyurethane dispersion; a water-soluble polymer of $M_w$ less than 55,000; a wax having a particle size ($d_{50}$) 200 nm or less; and a water-soluble solvent, and at least 20 wt % solids, based on the total weight of the formulation. A method of printing using the formulation, and a printed article are also described.

14 Claims, No Drawings

(56) References Cited

U.S. PATENT DOCUMENTS

| | | | | |
|---|---|---|---|---|
| 2009/0041932 A1* | 2/2009 | Ishizuka | ............... | C09D 11/326 |
| | | | | 524/588 |
| 2009/0315926 A1* | 12/2009 | Yamanobe | ........... | B41J 11/0022 |
| | | | | 347/102 |
| 2009/0322805 A1* | 12/2009 | Chiwata | ............... | B41J 11/0015 |
| | | | | 347/6 |
| 2014/0194560 A1 | 7/2014 | Leotsakos et al. | | |
| 2015/0025179 A1* | 1/2015 | Landa | ................... | C09D 11/322 |
| | | | | 524/88 |
| 2016/0222239 A1 | 8/2016 | Nakata et al. | | |
| 2017/0233595 A1* | 8/2017 | Erdodi | ................. | C09D 11/102 |
| | | | | 428/201 |
| 2018/0223119 A1 | 8/2018 | Oriakhi et al. | | |
| 2018/0282567 A1 | 10/2018 | Ishida | | |

FOREIGN PATENT DOCUMENTS

| | | |
|---|---|---|
| JP | 2016-117872 A | 6/2016 |
| WO | 2013/132439 A1 | 9/2013 |
| WO | 2018/075487 A1 | 4/2018 |

* cited by examiner

OVER-PRINT VARNISH FORMULATION

BACKGROUND

Inkjet printing involves the deposition of ink onto a substrate by jetting the ink through a print nozzle supplied by an ink cartridge.

Fixer fluid compositions can be used as pre-treatments prior to ink deposition, and over-print varnish compositions can be used as post-treatments.

DETAILED DESCRIPTION

Before particular embodiments of the present method and other aspects are disclosed and described, it is to be understood that the present method and other aspects are not limited to the particular process and materials disclosed herein as such may vary to some degree. It is also to be understood that the terminology used herein is used for the purpose of describing particular embodiments only and is not intended to be limiting, as the scope of the present method and other aspects will be defined only by the appended claims and equivalents thereof.

In the present specification, and in the appended claims, the following terminology will be used:

The singular forms "a", "an" and "the" include plural referents unless the context clearly dictates otherwise. Thus, for example, reference to "a pigment" includes reference to one or more of such materials.

The terms "about" and "approximately" when referring to a numerical value or range is intended to encompass the values resulting from experimental error that can occur when taking and/or making measurements.

Unless otherwise stated, references herein to "wt. %" of a component are to the weight of that component as a percentage of the whole composition comprising that component. For example, references herein to "wt. %" of, for example a solid material such as a pigment or latex polymer dispersed in a liquid composition are to the weight percentage of those solids in the composition, and not to the amount of that solid as a percentage of the total non-volatile solids of the composition.

As used herein, the term "particle size" is a reference to the mean particle size by volume, as measured using laser diffraction techniques using diffractometers such as the Malvern Mastersizer, or Microtrac or Nanotrac diffractometers.

As used herein, references to "fixing fluid", "fixer fluid", "optimiser fluid", "pre-treat fluid", "post-treat fluid", "overcoat fluid", or to compositions or formulations with the same names, are to liquid compositions that are intended to be printed before, simultaneously with, or after an inkjet ink composition has been printed onto a media substrate. Such fluids and compositions are generally known in the art, and are known generally to be free of colourant (i.e. are colourless), but can contain "crashing agents" to promote colourant aggregation and thereby reduce bleed.

As used herein, "ink vehicle" or "liquid vehicle" is defined to include liquid compositions that can be used to carry components such as pigments, to a substrate. Liquid vehicles are well known in the art, and a wide variety of liquid vehicle components may be used in accordance with examples of the present ink set and method. Such liquid vehicles may include a mixture of a variety of different agents, including without limitation, surfactants, co-solvents, buffers, biocides, viscosity modifiers, sequestering agents, stabilising agents, and water. Though not liquid per se, the liquid vehicle can also carry other solids, such as polymers, UV curable materials, plasticisers, salts, etc.

As used herein, "pigment" refers to colour imparting particulates that may be suspended in an ink vehicle. Pigments that can be used include self-dispersed pigments and non self-dispersed dispersed pigments. Self-dispersed pigments include those that have been chemically surface modified with a charge or a polymeric grouping. This chemical modification aids the pigment in becoming and/or substantially remaining dispersed in a liquid vehicle. The pigment can also be a non self-dispersed pigment that utilises a separate and unattached dispersing agent (which can be a polymer, an oligomer, or a surfactant, for example) in the liquid vehicle or physically coated on the surface of the pigment. The dispersing agent can be non-ionic or ionic, anionic or cationic. If the dispersing agent is anionic, possessing carboxy groups, for example, the pigment is referred to as an "anionic pigment dispersion".

As used herein, the term "set" refers to a set of inks, whether packaged or made available as part of a set, or packaged and made available separately for use with other members of the set.

As used herein, the term "wet-on-wet printing" refers to a printing method in which two or more print compositions are printed one on top of the other without drying of the underlying print layer before the overlying print layer is printed. As used herein, the term "wet-on-dry printing" refers to a printing method in which two or more print compositions are printed one on top of the other with drying of the underlying print layer before the overlying print layer is printed.

As used herein, "latex", "latex polymer", "latex particulates" or "latex particles" refer to the polymeric masses synthesised from individual monomers, which can be dispersed in a liquid vehicle forming a latex dispersion. The term "latex" generally refers to liquid and polymeric particles that are dispersed within the liquid. However, when a latex (i.e. a latex dispersion including latex polymer particles) is formulated within an ink, the liquid becomes part of the liquid vehicle of the ink, and thus, latex polymer can be described based on the latex particle or latex polymer solids that remain dispersed in the liquid vehicle. A latex may be a liquid suspension comprising a liquid (such as water and/or other liquids) and polymeric particulates from 20 nm to 500 nm (preferably from 100 nm to 300 nm) in size. Typically, the polymeric particulate can be present in the liquid at from 0.5 wt. % to 35 wt. %. Such polymeric particulates can comprise a plurality of monomers that are typically randomly polymerised, and can also be cross-linked. Additionally, in one embodiment, the latex component can have glass transition temperature from about −20° C. to +100° C.

As used herein, "co-polymer" refers to a polymer that is polymerised from at least two monomers.

A certain monomer may be described herein as constituting a certain weight percentage of a polymer. This indicates that the repeating units formed from the said monomer in the polymer constitute said weight percentage of the polymer.

The term "monomer emulsion" refers to an organic monomer or monomer that is emulsified in an aqueous or water phase. Once the organic monomer or monomer mix is polymerised, a latex polymer dispersion is formed.

The term "latex polymer dispersion" or "latex dispersion" includes both latex particulates as well as the aqueous medium in which the latex particulates are dispersed. More specifically, a latex dispersion is a liquid suspension comprising a liquid (such as water and/or other liquids) and polymeric particulates from 20 nm to 500 nm (preferably from 100 nm to 300 nm) in size, and having a weight average molecular weight from about 10,000 Mw to 2,000,000 Mw (preferably from about 40,000 Mw to 100,000 Mw). Such polymeric particulates can comprise a plurality of monomers that are typically randomly polymerised, and can also be crosslinked. When crosslinked, the molecular weight can be even higher than that cited above.

The term "(meth)acrylate" is well understood in the art to refer to both acrylates and methacrylates. For example, "cyclohexyl (meth)acrylate" refers to cyclohexyl acrylate and/or cyclohexyl methacrylate. Likewise, the term "cycloaliphatic (meth)acrylate monomer" denotes a cycloaliphatic acrylate monomer and/or a cycloaliphatic methacrylate monomer; and the term "aromatic (meth)acrylate monomer" denotes an aromatic acrylate monomer and/or an aromatic methacrylate monomer.

The term "(meth)acrylamide" is well understood in the art to refer to both acrylamides and methacrylamides. For example, the term "cycloaliphatic (meth)acrylamide monomer" denotes a cycloaliphatic acrylamide monomer and/or a cycloaliphatic methacrylamide monomer; and the term "aromatic (meth)acrylamide monomer" denotes an aromatic acrylamide monomer and/or an aromatic methacrylamide monomer.

Concentrations, amounts, and other numerical data may be presented herein in a range format. It is to be understood that such a range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of approximately 1 wt. % to approximately 20 wt. % should be interpreted to include not only the explicitly recited concentration limits of 1 wt. % to approximately 20 wt. %, but also to include individual concentrations such as 2 wt. %, 3 wt. %, 4 wt. %, and sub-ranges such as 5 wt. % to 10 wt. %, 10 wt. % to 20 wt. %, etc.

In the following description, for purposes of explanation, numerous specific details are set forth in order to provide a thorough understanding of the present print set, printed article and method for printing. It will be apparent, however, to one skilled in the art, that the present method maybe practiced without these specific details. Reference in the specification to "one example" or "an example" means that a particular feature, structure, or characteristic described in connection with the example is included in at least one example. The appearance of the phrase "in one example" in various places in the specification are not necessarily all referring to the same example.

Unless otherwise stated, any feature described herein can be combined with any aspect or any other feature described herein.

Wet-on-wet printing may be desirable, for example, so that in-line printing can be performed. Wet-on-wet printing could also eliminate the need for a separate drying step before application of an over-print composition, reducing the size of the apparatus and cost of running it. Wet-on-wet printing can result in loss of high gloss, durability and acceptable levels of coalescence when printing existing latex-based over-print varnish compositions onto ink compositions printed on absorbing (e.g. porous) substrates, while non-ionic polyurethane dispersions are unsuitable for jettable over-print varnish compositions as such dispersions exhibit thixotropic rheologies in water and so cannot be jetted reliably under typical jetting conditions.

Therefore, the present inventors have sought to provide over-print varnish formulations, for use in the method of wet-on-wet printing. The present inventors have found that over-print varnish compositions in accordance with the present disclosure exhibit Newtonian-like rheology and are particularly effective at affording printed articles with excellent gloss levels, durability and acceptable levels of coalescence when printing in a wet-on-wet inkjet application method.

In an aspect there is provided an over-print varnish formulation comprising: a non-ionic polyurethane dispersion; a water-soluble polymer of $M_w$ less than 55,000; a wax having a particle size ($d_{50}$) 200 nm or less; and a water-soluble solvent, wherein the formulation comprises at least 20 wt % solids, based on the total weight of the formulation.

In a further aspect there is provided a method of printing, comprising: applying a fixer composition onto a substrate; applying an ink composition onto the fixer composition; and applying an over-print varnish formulation onto the ink composition, wherein the over-print varnish formulation comprises: a non-ionic polyurethane dispersion; a water-soluble polymer of $M_w$ less than 55,000; a wax particle having a particle size ($d_{50}$) 200 nm or less; a water-soluble solvent; and at least 20 wt % solids, based on the total weight of the formulation.

In a further aspect there is provided a printed article, comprising: a substrate; a fixer composition disposed on the substrate, an ink composition disposed on the fixer composition; and an over-print varnish formulation disposed on the ink composition, wherein the over-print varnish formulation comprises: a non-ionic polyurethane dispersion; a water-soluble polymer of $M_w$ less than 55,000; a wax particle having a particle size ($d_{50}$) 200 nm or less.

Over-Print Varnish Formulation

Described herein is an over-print varnish formulation. In some examples, the varnish formulation comprises a non-ionic polyurethane dispersion; a water-soluble polymer of $M_w$ less than 55,000; a wax having a particle size ($d_{50}$) 200 nm or less; and a water-soluble solvent, wherein the formulation comprises at least 20 wt % solids, based on the total weight of the formulation.

The varnish formulation described herein can be an aqueous formulation. Such formulation are environmentally preferable compared to solvent-based or UV curable compositions.

In some examples, the varnish formulation has a viscosity in the range of about 5-20 cP, where the viscosity is measured at the jetting temperature (i.e. the temperature at which the composition is to be jetted). In some examples, the jetting temperature is a temperature in the range of about 10° C. to about 50° C., for example about 20-40° C., or about 25° C.

In some examples, the varnish formulation has a viscosity of at least about 5 cP at 25° C. In some examples, the varnish formulation has a viscosity of up to about 30 cP at 25° C., for example up to about 25 cP at 25° C., or up to about 20 cP at 25° C. In some examples, the varnish formulation has a viscosity in the range of about 5-20 cP at 25° C.

The viscosity of the varnish formulation may be determined according to ISO3219, DIN.

In some examples, the viscosity of the varnish formulation is adjusted by adjusting the amount of water contained in the composition.

In some examples, the varnish formulation has a surface tension in the range of about 20-40 dynes/cm, where the surface tension is measured at the jetting temperature (i.e. the temperature at which the composition is to be jetted). In some examples, the jetting temperature is a temperature in the range of about 10° C. to about 50° C., for example about 20-40° C., or about 25° C.

In some examples, the varnish formulation has a surface tension of at least about 15 dynes/cm at 25° C., for example at least about 20 dynes/cm at 25° C. In some examples, the varnish composition has a surface tension of up to about 50 dynes/cm at 25° C., for example up to about 45 dynes/cm at 25° C., or up to about 40 dynes/cm at 25° C. In some examples, the varnish formulation has a surface tension in the range of about 20 to about 40 dynes/cm at 25° C.

The surface tension of the varnish formulation may be determined according to ASTM D1331-89.

In some examples, the varnish formulation contains water in an amount of from about 30 wt % to about 80 wt % by total weight of the composition, for example from about 40 wt % to about 60 wt % by total weight of the composition.

In some examples, the jettable varnish formulation comprises up to about 50 wt % solids by total weight of the formulation, for example, up to about 40 wt % solids, or up to about 30 wt % solids by total weight of the formulation. In some examples, the jettable varnish formulation comprises at least 20 wt % solids by total weight of the varnish formulation, for example at least about 30 wt % solids, or at least about 40 wt % solids by total weight of the varnish formulation. In some examples, the varnish formulation comprises from about 20 wt % to about 30 wt % solids by total weight of the formulation.

As used herein, the term "solids" of the varnish formulations is used to refer to the components of the varnish formulation that remain after a varnish image formed by printing a varnish formulation is dried, for example following evaporation of water and the co-solvent from the varnish formulation. For example, the term "solids" of the varnish formulation includes the water-soluble polymer as well as the polyurethane and wax, even though the water-soluble polymer is soluble in the aqueous varnish formulation. The "solids" of the varnish formulation may also include surfactants that may be included in the varnish formulation.

The varnish formulation may be a transparent (e.g. transparent and colourless) varnish formulation, for example having no or substantially no colorant (e.g. pigment) and thus may be a pigment-free, or substantially pigment-free formulation. The varnish formulation may comprise less than 2 wt % solids of colorant, in some examples less than 1 wt % solids of colorant, in some examples less than 0.5 wt % solids of colorant, in some examples less than 0.1 wt % solids of colorant. A "colorant" may be a material that imparts a color to the formulation. As used herein, "colorant" includes pigments and dyes, such as those that impart colors such as black, magenta, cyan and yellow to an ink. As used herein, "pigment" generally includes pigment colorants, magnetic particles, aluminas, silicas, and/or other ceramics or organo-metallics. In some examples, the varnish formulation when printed as an overcoat varnish layer over a printed image does not substantially affect the colour of an underprinted image when viewed with the naked eye.

In some examples, the varnish formulation has a minimum film formation temperature (MFFT) of up to about 40° C., in some examples up to about 30° C. or up to about 25° C. In some examples, the varnish formulation has a MFFT in the range of about 10° C. to about 40° C., for example about 10° C. to about 30° C., about 15° C. to about 30° C., or about 20° C. to about 30° C. In some examples, the varnish formulation has a MFFT of about 25° C. The MFFT of a varnish formulation may be determined using a MFFT 90 Minimum Film Forming Temperature Instrument (available from Rhopoint™ Instruments). The MFFT of a varnish formulation may be determined according to ASTM D2354.

Non-Ionic Polyurethane Dispersion

The over-print varnish formulation comprises a non-ionic polyurethane dispersion. By "polyurethane dispersion" it is meant herein a polyurethane binder or polyurethane that is dispersed in a liquid medium. In some examples, the polyurethane binder is present in a dispersion with water. As used herein, the term "dispersion" refers to a two-phases system where one phase consists of finely divided particles of polyurethane binder distributed throughout a bulk substance, i.e. liquid vehicle. The polyurethane particles being the dispersed or internal phase and the bulk substance being the continuous or external phase (liquid vehicle).

In some examples, the non-ionic polyurethane dispersion is present in the varnish formulation in an amount ranging from about 1 wt % to about 30 wt % based upon the total wt % of the varnish formulation. In some other examples, the non-ionic polyurethane dispersion is present in the varnish formulation an amount ranging from about 2 wt % to about 25 wt % based upon the total wt % of the varnish formulation. In yet some other examples, the non-ionic polyurethane dispersion is present in the varnish formulation an amount ranging from about 3 wt % to about 18 wt % based upon the total wt % of the varnish formulation. The weight percentages given for the non-ionic polyurethane dispersion do not account for any other components (e.g., water) that may be present when the non-ionic polyurethane is part of the dispersion.

Examples of suitable non-ionic polyurethanes include an aromatic polyether polyurethane, an aliphatic polyether polyurethane, an aromatic polyester polyurethane, an aliphatic polyester polyurethane, an aromatic polycaprolactam polyurethane, an aliphatic polycaprolactam polyurethane, a vinyl-urethane hybrid polymer, an acrylic-urethane hybrid polymer, a co-polymer thereof, and a combination thereof. In one example, the non-ionic polyurethane dispersion comprises an aliphatic polyurethane, a cycloaliphatic polyurethane or an aromatic polyurethane. The non-ionic polyurethanes can include polyurethane, polyurea, polyurethane-graph polyol, or a combination thereof. In a further example, the binder can include a polyurethane graph polyol such as PUG-49, PUG-84, PUG-400 or Pluracol® (available from BASF, New Jersey). In yet another example, the non-ionic polyurethanes can further include an acrylic functional group. For example, the binder can include methyl methacrylate, 2-ethylhexyl acrylate, 2-(2-ethoxyethoxy)ethyl acrylate, or a combination thereof.

In some examples, the polyurethanes can have a weight average molecular weight ranging from 10,000 MW to 500,000 MW, for example a weight average molecular weight ranging from 100,000 MW to 200,000 MW.

In some examples, the non-ionic polyurethane contains a polyisocyanate component (A) and a polyol (B). In some examples, the non-ionic polyurethane contains a polyisocyanate component (A) and a first polyol (B) and a second polyol (C). The non-ionic polyurethane can also be a polyurethane that comprises (A) a polyisocyanate; (B) a first polyol having a chain with two hydroxyl functional groups at one end of the chain and no hydroxyl groups at an opposed end of the chain; (C) a second polyol having a chain with two hydroxyl functional groups at both ends of the chain.

In some other examples, the non-ionic polyurethane may be formed from the following components: (A) a polyisocyanate; (B) a polyol having a chain with two hydroxyl functional groups at one end of the chain and no hydroxyl functional groups at the opposed end of the chain; and (C) an alcohol, or a diol, with a number average molecular weight less than 500.

In some examples, when defining (A) the polyisocyanate, any suitable polyisocyanate may be used. Some suitable polyisocyanates have an average of about two or more isocyanate groups. In an example, the polyisocyanate includes an average of from about 2 to about 4 isocyanate groups per molecule and from about 5 to 20 carbon atoms (in addition to nitrogen, oxygen, and hydrogen). Component (A) may be an aliphatic, cycloaliphatic, araliphatic, or aromatic polyisocyanate, as well as products of their oligomerization, used alone or in mixtures of two or more. For example, a polyisocyanate having an average of two or more isocyanate groups may be used. Some examples of polyisocyanates include hexamethylene-1,6-diisocyanate (HDI), 2,2,4-trimethyl-hexamethylene-diisocyanate (TMDI), 1,12-dodecane diisocyanate, 2,4,4-trimethyl-hexamethylene diisocyanate, 2-methyl-1,5-pentamethylene diisocyanate, isophorone diisocyanate (IPDI), dicyclohexylmethane-4,4-diisocyanate (H12MDI), and combinations thereof. The amount of the polyisocyanate in the polyurethane dispersion ranges from about 20 wt % to about 45 wt % of the total weight of the polyurethane dispersion. In an example, polyisocyanate makes up from about 25 wt % to about 35 wt % of the polyurethane.

The amount of component (B) (i.e., the first polyol) in the polyurethane can range from about 10 wt % to about 70 wt % of the total weight of the polyurethane. In an example, component (B) (i.e., the first polyol) can make up from about 30 wt % to about 60 wt % of the polyurethane binder. The first polyol (B) can include any homopolymer or copolymer of poly(ethylene glycol) having one or two hydroxyl functional groups at one or both ends of its chain. The first polyol (B) can include any product having a chain with two hydroxyl groups at one end of the chain and no hydroxyl groups at the opposed end of the chain. The first polyol has a number average molecular weight (Mn) ranging from about 500 g/mol to about 5000 g/mol. Additionally, the first polyol has a glass transition temperature (Tg) ranging from about −20° C. to about 100° C. In an example, the glass transition temperature can range from about 0° C. to about 80° C. The first polyol may be formed from the free radical polymerization of a monomer in the presence of a mercaptan that includes two hydroxyl functional groups or two carboxylic functional groups. Some examples of the monomer used to form component (B) include an alkylester of acrylic acid or an alkylester of methacrylic acid, such as methyl (meth)acrylate, ethyl (meth)acrylate, n-butyl (meth)acrylate, tetrahydrofuryl (meth)acrylate, t-butyl (meth)acrylate, 2-ethylhexyl (meth)acrylate, hexyl (meth)acrylate, cyclohexyl (meth)acrylate, phenyl (meth)acrylate, benzyl (meth)acrylate, 2-aziridinylethyl (meth)acrylate, aminomethyl acrylate, aminoethyl acrylate, aminopropyl (meth)acrylate, amino-n-butyl(meth)acrylate, N,N-dimethylaminoethyl (meth)acrylate, N,N-dimethylaminopropyl (meth)acrylate, N,N-diethylaminoethyl (meth)acrylate, and N,N-diethylaminopropyl (meth)acrylate. Some other examples of the monomer used to form component (B) include an acid group containing monomer, such as acrylic acid, methacrylic acid, carboxyethyl (meth)acrylate, 2-(meth)acryloyl propionic acid, crotonic acid, and itaconic acid. In another example, the monomer used to form component (B) may be an acrylamide, an acrylamide derivative, methacrylamide, or a methacrylamide derivative. Some examples of acrylamide and methacrylamide derivatives include hydroxyethylacrylamide, N,N-methylol(meth)acrylamide, N-butoxymethyl (meth)acrylamide, and N-isobutoxymethyl (meth)acrylamide. Some further examples of the monomer used to form component (B) may be styrene or a styrene derivative. Some examples of styrene derivatives include alpha-methyl styrene, p-aminostyrene, and 2-vinylpyridine. Additionally, the monomer used to form component (B) may be acrylonitrile, vinylidene chloride, a fluorine containing acrylate, a fluorine containing methacrylate, a siloxane containing acrylate, a siloxane containing methacrylate, vinyl acetate, or N-vinylpyrrolidone. Some specific examples include 2,2,2-trifluoroethyl acrylate, 1H,1H,3H-hexafluorobutyl acrylate, 1H,1H,3H-tetrafluoropropyl methacrylate, 1H, 1H,5H-octafluoropentyl methacrylate, 1H, 1H,5H-octafluoropentyl acrylate, poly(dimethylsiloxane), methacryloxypropyl terminated polydimethylsiloxane DMS-R11 (made by Gelest Chemicals), and (3-acryloxy-2-hydroxypropoxypropyl) terminated polydimethylsiloxane DMS-U21 (made by Gelest Chemicals). It is to be understood that any combination of monomers listed for component (B) may be used.

In some examples, the polyol (B), and/or the second polyol (i.e., component (C) can be present in the polyurethane-based binder dispersion in an amount of from about 8 wt % to about 25 wt % based on the total weight of the polyurethane-based binder dispersion. In an example, component (B) (i.e., the first polyol) makes up from about 10 wt % to about 20 wt % of the polyurethane binder. The polyol(s) can have a number average molecular weight (Mn) of about 500 g/mol to about 3000 g/mol and have one hydroxyl group attached at each end of the polyol. Examples of polyols include polyester polyols, polyether polyols, polycarbonate polyol, polyester-polycarbonate polyol, or mixtures thereof. In some examples, the polyol can be poly(propyleneglycol), poly(tetrahydrofuran), poly(carbonate) polyol, or mixtures thereof. Examples of polycarbonate polyol include polycarbonate polyols from Kuraray Co. Ltd. (e.g., C-590, C-1050, C-1090, C-2050, C-2090, and C-3090) and polycarbonate diols from UBE Industries, Ltd. (e.g., Eternacoll® Uh-50, Eternacoll® Uh-100, Eternacoll® Uh-200, Eternacoll® Ph-5-, Eternacoll® Ph-100, Eternacoll® Ph-200 And Eternacoll® Um90(⅓)).

In some examples, the polyurethane compound comprises a homopolymer or copolymer of poly(ethylene glycol). The homopolymer or copolymer of poly(ethylene glycol) can have two hydroxyl functional groups or two amino functional groups at one or both ends of its chain. The homopolymer or copolymer of poly(ethylene glycol) has a number average molecular weight (Mn) ranging from about 500 g/mol to about 5,000 g/mol. In another example, the homopolymer or copolymer of poly(ethylene glycol) has a number average molecular weight (Mn) ranging from about 500 g/mol to about 3,000 g/mol. The homopolymer or copolymer of poly(ethylene glycol) has a water solubility of greater than 30% v/v (volume of poly(ethylene glycol) to volume of water). The amount of the homopolymer or copolymer of poly(ethylene glycol) in the polyurethane ranges from 0 wt % to about 20 wt % based upon the total weight of the polyurethane. In an example, the homopolymer or copolymer of poly(ethylene glycol) can be present in the polyurethane in an amount of from about 5 wt % to about 10 wt % of the polyurethane.

Any homopolymer of poly(ethylene glycol) with two hydroxyl or amino groups at one or both ends of the polymer chain may alternatively be used, as long as the homopolymer has water solubility of >about 30% v/v and a suitable number average molecular weight. As an example, the homopolymer may be two hydroxyl terminated poly(ethylene glycol), where both hydroxyls are located at one end of the chain. One commercially available example is YMER® N120 (a linear difunctional polyethylene glycol monomethyl ether from Perstorp).

Examples of commercially available non-ionic polyurethane dispersions include Joncryl FLX 5201 from BASF.

Water-Soluble Polymer of $M_w$ Less than 55,000

The over-print varnish formulation described herein comprises a water-soluble polymer of $M_w$ (weight averaged molecular weight) less than 55,000. In some examples, the water-soluble polymer has a $M_w$ less than 50,000, for example less than 40,000, for example less than 35,000, for example less than 30,000, for example less than 25,000, for example less than 20,000, for example less than 15,000, for example to about 10,000.

In some examples, the over-print varnish formulation comprises a water-soluble polymer of $M_w$ (weight averaged molecular weight) greater than 10,000. In some examples, the water-soluble polymer has a $M_w$ greater than 15,000, for example greater than 20,000, for example greater than 25,000, for example greater than 30,000, for example greater than 40,000, for example greater than 50,000, for example to about 55,000.

In some examples, the over-print varnish formulation comprises a water-soluble polymer of $M_w$ (weight averaged molecular weight) in the range of from 10,000 to 55,000, for example from 15,000 to 50,000, for example from 20,000 to 40,000, for example from 27,000 to 33,000.

In some examples, the water-soluble polymer is a polymer having a molecular weight represented by its K-value (measured as a 1% solution in water) of no more than 35, for example no more than about 33, for example no more than about 30, for example about 27. The K-value of a polymer is related to its intrinsic viscosity and is determined according to the Fikentscher equation.

In some examples, the water-soluble polymer is a cationic polymer. Many different types of cationic polymer are known in the art to be suitable for use in overprint varnish formulations. In one example, the cationic polymer comprises one or more of a quaternary amine, a polyamine, such as a polyethyleneimine ("PEI"), a polyguanidine cationic polymer, a water-soluble cationic dendrimer, a polyallylamine, a poly diallyl dimethyl ammonium chloride, or a polyvinyl pyrrolidone. Suitable polyamines include those derived from epichlorohydrin and dimethyl amine, for example copolymers of epichlorohydrin and dimethyl amine. Suitable polyguanidine cationic polymers may include, but are not limited to, hexamethylene guanide ("HMG"), a polymer of hexamethylene biguanide ("HMB"), and a copolymer of HMB and HMG. PHMB is available from Avecia™ Ltd. (Manchester, England). Suitable cationic polymers may include, but are not limited to, those obtainable from SNF Group such as Floquat™ 4150 (or Floquat™ 2350), a linear polyamine, as well as structured polyamines such as Floquat™ 2999, 2949, 3249, 2370 and 2273. In some examples, the cationic polymer is a polyvinyl pyrrolidone having a K-30 value.

In some examples, the water-soluble polymer is present in the over-print varnish formulation in an amount of no more than about 5 wt % based on the total weight of the varnish formulation, for example no more than about 4 wt %, for example no more than about 3 wt %, for example about 2 wt % based on the total weight of the over-print varnish formulation.

Wax Having a Particle Size ($d_{50}$) 200 nm or Less

The over-print varnish formulation described herein comprises a wax having a particle size ($d_{50}$) 200 nm or less, for example a particle size ranging from 50 nm to 200 nm. In some examples, the wax can have a particle size ranging from 100 nm to 200 nm.

In some examples the wax is present in the over-print varnish formulation as a wax emulsion or dispersion. In some examples, the wax emulsion or dispersion is present in the over-print varnish formulation in an amount ranging from 0.25 wt % to 10 wt % by total weight of the over-print varnish formulation. In some examples, the wax dispersion is present in an amount of from 0.1 wt % to 8 wt %, in some examples from about 2 wt. % to about 7 wt. %. In some examples, the wax of the wax emulsion or dispersion (excluding the medium in which the wax is emulsified or dispersed) is present in the over-print varnish formulation in an amount of from 0.1 wt % to 3 wt %, in some examples from about 1 wt. % to about 2 wt. % based on the total weight of the over-print varnish formulation.

In some examples, the wax may be a natural wax or a synthetic wax. In some examples, the wax may be selected from vegetable wax, mineral wax, petroleum wax, paraffin wax, microcrystalline wax, synthetic Fischer-Tropsch waxes, and amide-modified wax.

In some examples, vegetable waxes, mineral waxes and petroleum waxes comprise organic compounds having hydrophobic properties. In some examples, vegetable waxes, mineral waxes and petroleum waxes are esters of long-chain acids, which may comprise between 40 and 50 carbon atoms. In some examples, the natural wax may be castor oil or hydrogenated castor oil. In some examples, paraffin waxes may comprise linear hydrocarbon chains, which may comprise between 25 and 50 carbon atoms. In some examples, microcrystalline waxes may comprise branched chain hydrocarbons, which may comprise between 70 and 90 carbon atoms. In some examples, synthetic Fischer-Tropsch waxes may comprise linear hydrocarbon chains, which may have a higher weight average molecular weight than paraffin waxes. In some examples, Fischer-Tropsch waxes may comprise linear hydrocarbon chains, which may have at least 50 carbon atoms, in some examples, from 50 to 90 carbon atoms. In some examples, amide-modified waxes are primary amides formed from the reaction of a diaminoalkylene with a long-chain acid or a fatty acid. In some examples, amide-modified waxes are primary amides formed from the reaction of 1,2-diaminoethane with a long chain acid or fatty acid. In some examples, the wax may be a polyethylene wax dispersion.

The wax may be provided as a wax emulsion or dispersion. Wax emulsions or dispersions are commercially available from a number of vendors, for example Keim-Additec, Lubrizol, Michelman, and BYK Chemie. Wax emulsions or dispersions that are useful in this invention include but are not limited to: Lubrizol: Liquilube™ 411, Liquilube™ 405, Liquilube™ 488, Liquilube™ 443, Liquilube™ 454; Michelman: ME80825, ME48040, ME98040M1, ME61335, ME90842, ME91240, ML160; Keim-Additec: Ultralube® E-521/20, Ultralube® E-7093, Ultralube® 7095/1, Ultralube® E-8046, Ultralube® E-502V, Ultralube® E-842N: Byk: Aquacer® 2650, Aquacer® 507, Aquacer® 533, Aquacer® 515, Aquacer® 537, Aquaslip™ 671, Aquaslip™ 942; Joncryl Wax 35.

Water-Soluble Solvent

The water-soluble solvent, also referred to herein as a co-solvent, and water of the varnish formulation may be described as the 'liquid vehicle' of the jettable varnish composition. In some examples, the liquid vehicle of the varnish formulation comprises from about 50 wt. % to about 95 wt. %, for example from about 60 wt. % to about 90 wt.

% of the composition by total weight of the formulation. In some examples, the liquid vehicle comprises water and about 1 wt. % to about 70 wt. % organic co-solvent, for example water and about 5 wt. % to about 50 wt. % organic co-solvent.

In some examples, the varnish formulation comprises at least about 2 wt. % co-solvent by total weight of the composition, for example at least 5 wt. %, at least about 10 wt. %, at least about 15 wt. %, or about 20 wt. % co-solvent by total weight of the formulation. In some examples, the varnish formulation comprises up to about 60 wt. % co-solvent by total weight of the formulation, for example up to about 50 wt. %, up to about 40 wt. %, or up to about 30 wt. % co-solvent by total weight of the formulation.

The co-solvent may be an organic solvent, for example a water-soluble organic solvent.

Examples of water-soluble organic co-solvents include: aliphatic alcohols, aromatic alcohols, diols, glycol ethers, poly(glycol) ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. For example, co-solvents can include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, lactams, substituted formamides, unsubstituted formamides, substituted acetamides, and unsubstituted acetamides.

In some examples, the co-solvent is selected from 1,5-pentanediol, 2-pyrrolidone, 2-ethyl-2-hydroxymethyl-1,3-propanediol, diethylene glycol, dipropylene glycol, ethoxylated glycerol, 3-methoxybutanol, 1,3-dimethyl-2-imidazolidinone, or mixtures thereof.

In some examples, the co-solvent is selected from the group comprising diethylene glycol, dipropylene glycol, tetraethylene glycol, 1,5-pentanediol, 2-pyrrolidone, 2-methyl-2,4-pentanediol, 2-methyl-1,3-propanediol, 2-ethyl-2-hydroxymethyl-1,3-propanediol, 3-methoxybutanol, propylene glycol monobutyl ether, and 1,3-dimethyl-2-imidazolidinone.

Co-solvents may be added to reduce the rate of evaporation of water in the varnish to minimize clogging or to adjust other properties of the ink such as viscosity, pH, and surface tension.

Additives

In some examples, the varnish formulation further comprises one or more additives from surfactants, buffers, biocides, viscosity modifiers, sequestering agents, stabilizing agents, humectants, and combinations thereof. In some examples, the varnish formulation is a piezo-jettable varnish formulation.

Method of Printing

In some examples, a method of inkjet printing is described, comprising: applying a fixer composition onto a substrate; applying an ink composition onto the fixer composition; and applying an over-print varnish formulation onto the ink composition, wherein the over-print varnish formulation comprises: a non-ionic polyurethane dispersion; a water-soluble polymer of $M_w$ less than 55,000; a wax particle having a particle size ($d_{50}$) 200 nm or less; a water-soluble solvent; and at least 20 wt % solids, based on the total weight of the formulation.

In some examples, the method is a wet-on-wet method, in which the ink composition is applied onto the fixer composition while the fixer composition is still wet. In some examples, the method is a wet-on-wet method, in which the over-print varnish composition is applied onto the ink composition while the fixer composition and/or the ink composition are still wet. In some examples, the method is a one-pass wet-on-wet printing method. In some examples, the wet-on-wet printing method comprises a delay of no more than about 5 seconds between each printing stage, for example no more than about 4 seconds, for example no more than about 3 seconds, for example no more than about 2 seconds, for example no more than about 1 second, for example no more than about 0.5 seconds, for example no more than about 0.1 second.

In some examples, the fixer fluid composition is as described herein. The fixer fluid composition is suited for use as a pre-treatment undercoat to the printed ink composition. In one example, the fixer fluid composition is printed as a pre-treatment onto the substrate before the ink composition is printed. In some examples, the fixed fluid composition is applied to the substrate using an inkjet printer. In some examples, the fixed fluid composition is digitally applied to the substrate using an inkjet printer.

In some examples, the substrate is a porous substrate, for example paper, cardboard, for example corrugated cardboard or a polyester textile. The nature of the substrate will depend on the end application of the printed article, i.e. the user requirements.

In some examples, the ink composition is as described herein. In some examples, the ink composition is an inkjet composition, for example a thermal inkjet composition, or a piezo inkjet composition. In some examples, the inkjet composition is applied onto the fixer composition on the substrate, and is subsequently printed over with the over-print varnish composition. In some examples, the ink composition is digitally printed onto the fixer composition.

In some examples, the over-print varnish composition is as described herein. The over-print varnish composition is suited for use as a post-treatment overcoat to the printed ink composition. In one example, the over-print varnish composition is printed as an overcoat onto the substrate after the ink composition has been printed. In some examples, the over-print varnish formulation is digitally printed as an overcoat onto the ink composition.

In one example, the amount of fixer fluid composition relative to ink composition printed onto the substrate may be less than about 25%, expressed as a volume percentage. In other words, a ratio of 25% is equivalent to 4 volume parts ink to every one volume part of fixer composition. In one example, the amount of fixer fluid composition relative to ink composition printed onto the substrate may be less than 20%, for example less than about 18%, for example less than about 16%, for example less than about 14%, for example less than about 12%, for example less than about 10%, for example less than about 8%, for example less than about 6%, for example less than about 5%, expressed as a volume percentage.

In one example, the amount of fixer fluid composition relative to ink composition printed onto the substrate may be greater than about 5%, expressed as a volume percentage. In one example, the amount of fixer fluid composition relative to ink composition printed onto the substrate may be greater than 6%, for example greater than about 8%, for example greater than about 10%, for example greater than about 12%, for example greater than about 14%, for example greater than about 16%, for example greater than about 18%, for example greater than about 20%, for example greater than about 25%, expressed as a volume percentage.

In some examples, the amount of over-print varnish composition printed over the ink is such that a coverage of at least 5 grams per square meter (gsm) is achieved. In some examples, the amount of over-print varnish composition printed over the ink is at least 5.1 gsm, for example at least 5.2 gsm, for example at least 5.3 gsm, for example at least 5.4 gsm, for example at least 5.5 gsm, for example at least 6 gsm, 7 gsm, 8 gsm, 9 gsm or to about 10 gsm.

In some examples, the method further comprises a drying step, following application of the over-print varnish composition. In some examples, the drying step comprises application of heat. In some examples, the drying step comprises application of a flow of air, causing evaporation. In some examples the drying step comprises passing the printed article resulting from the method to a source of heat. The source of heat may be for example a heater, for example an IR heater.

Fixer Fluid Composition

The method of printing described herein comprises applying a fixer fluid composition on a substrate. The method may be a method of inkjet printing and may comprise jetting the fixer fluid composition onto the substrate. In one example, the inkjet fixing fluid composition is substantially free of colorant. By substantially free of colorant, it will be understood that the composition appears colourless to the unaided eye under normal light and is thus distinguished from an inkjet ink composition comprising colorant such as cyan, magenta, yellow or black. In one example, the composition is an aqueous solution, substantially free of any dispersed solids.

Fixer fluids in general are used in printing methods. In some examples the fixer fluid composition comprises a crashing agent and a liquid vehicle.

In one example, the crashing agent comprises one or more of a cationic polymer, a polyvalent metal ion and an organic acid.

In one example, cationic polymer comprises a water soluble cationic polymer. The water soluble cationic polymer may be present in an amount of less than about 5 wt. %. In one example, the inkjet fixing composition comprises a cationic polymer present in an amount of less than about 4 wt. %, for example less than about 3 wt %, for example less than about 2.5 wt %, for example less than about 2.4 wt %, for example less than about 2.3 wt %, for example less than about 2.2 wt %, for example less than about 2.1 wt %, for example less than about 2 wt %, for example less than about 1.5 wt %, for example about 1 wt %, based on the total weight of the composition.

In one example, the cationic polymer present is present in an amount of greater than about 1 wt. %. In one example, the fixing composition comprises a cationic polymer present in an amount of greater than about 1.5 wt. %, for example greater than about 2 wt %, for example greater than about 2.1 wt %, for example greater than about 2.2 wt %, for example greater than about 2.3 wt %, for example greater than about 2.4 wt %, for example greater than about 2.5 wt %, for example greater than about 3 wt %, for example greater than about 4 wt %, for example about 5 wt %, based on the total weight of the composition.

Many different types of cationic polymer are known in the art to be suitable for use in fixing fluid compositions. In one example, the cationic polymer comprises one or more of a quaternary amine, a polyamine, such as a polyethyleneimine ("PEI"), a polyguanidine cationic polymer, a water-soluble cationic dendrimer, a water-dispersed alkoxylated form of polyethyleneimine, a water-dispersed alkoxylated form of a dendrimer, a water-soluble alkoxylated form of a dendrimer, polyallylamine, poly diallyl dimethyl ammonium chloride, or a polyvinyl pyrrolidone. Suitable polyamines include those derived from epichlorohydrin and dimethyl amine, for example copolymers of epichlorohydrin and dimethyl amine. Suitable polyguanidine cationic polymers may include, but are not limited to, hexamethylene guanide ("HMG"), a polymer of hexamethylene biguanide ("HMB"), and a copolymer of HMB and HMG. PHMB is available from Avecia™ Ltd. (Manchester, England). Suitable cationic polymers may include, but are not limited to, those obtainable from SNF Group such as Floquat™ 2350, a linear polyamine, as well as structured polyamines such as Floquat™ 2999, 2949, 3249, 2370 and 2273.

In one example, the fixer fluid composition comprises an organic acid present in an amount of about 3 wt. % or less. In one example, the inkjet fixing composition comprises an organic acid present in an amount of about 2.5 wt % or less, for example in an amount of about 2 wt % or less, for example in an amount of about 1.5 wt % or less, for example in an amount of about 1 wt % or less, for example in an amount of about 0.9 wt % or less, for example in an amount of about 0.8 wt % or less, for example in an amount of about 0.7 wt % or less, for example in an amount of about 0.6 wt % or less, for example in an amount of about 0.5 wt %.

In one example, the inkjet fixing composition comprises an organic acid present in an amount of greater than about 0.5 wt. %. In one example, the inkjet fixing composition comprises an organic acid present in an amount of greater than about 0.6 wt %, for example in an amount of greater than about 0.7 wt %, for example in an amount of greater than about 0.8 wt %, for example in an amount of greater than about 0.9 wt %, for example in an amount of greater than about 1 wt %, for example in an amount of greater than about 1.5 wt %, for example in an amount of greater than about 2 wt %, for example in an amount of greater than about 2.5 wt %, for example in an amount of greater than about 3 wt %.

In one example, the organic acid comprises one or more of succinic acid, citric acid, glycolic acid, nitric acid, hydrochloric acid, phosphoric acid, sulfuric acid, polyacrylic acid, acetic acid, malonic acid, maleic acid, ascorbic acid, glutaric acid, fumaric acid, tartaric acid, lactic acid, nitrous acid, boric acid, carbonic acid, carboxylic acids such as formic acid, chloroacetic acid, dichloroacetic acid, trichloroacetic acid, fluoroacetic acid, trimethylacetic acid, methoxyacetic acid, mercaptoacetic acid, propionic acid, butyric acid, valeric acid, caproic acid, caprylic acid, capric acid, lauric acid, myristic acid, palmitic acid, stearic acid, oleic acid, rinolic acid, rinoleic acid, cyclohexanecarboxylic acid, phenylacetic acid, benzoic acid, o-toluic acid, m-toluic acid, p-toluic acid, o-chlorobenzoic acid, m-chlorobenzoic acid, p-chlorobenzoic acid, o-bromobenzoic acid, m-bromobenzoic acid, p-bromobenzoic acid, o-nitrobenzoic acid, m-nitrobenzoic acid, p-nitrobenzoic acid, oxalic acid, adipic acid, phthalic acid, isophthalic acid, terephthalic acid, salicylic acid, p-hydrobenzoic acid, anthranilic acid, m-aminobenzoic acid, p-aminobenzoic acid, benzenesulfonic acid, methylbenzenesulfonic acid, ethylbenzenesulfonic acid, dodecylbenzenesulfonic acid, 5-sulfosalicylic acid, 1-sulfonaphthalene, hexanesulfonic acid, octanesulfonic acid, dodecanesulfonic acid, amino acids such as glycine, alanine, valine, alpha-aminobutyric acid, alpha-aminobutyric acid, alpha-alanine, taurine, serine, alpha-amino-n-caproic acid, leucine, norleucine, phenylalanine, and combinations thereof.

In one example, the fixer fluid composition comprises a polyvalent metal salt. The polyvalent metal salt may be any salt of a metal ion wherein the metal ion carries more than one charge, for example a salt of a divalent metal ion, a salt of a trivalent metal ion, a salt of a tetravalent metal ion and so on.

In one example, the metal ion is divalent calcium. In some examples, the calcium-containing polyvalent metal salt is an organic calcium salt, an inorganic calcium salt, or a mixture thereof. In some examples, the calcium-containing metal salt is a cationic mixture of organic and inorganic calcium salt. In some examples, the calcium-containing metal salt can be a mixture of a metal carboxylate salt and of a water-soluble polyvalent metal salt comprising calcium.

As a metal carboxylate salt, it is meant herein a metal salt composed of a multivalent metallic ion and of a carboxylate ion. The metal carboxylate salt can be selected from the group consisting of calcium propionate salt, calcium acetate salt and calcium butyrate salt. In some examples, the metal carboxylate salt is calcium propionate. As water-soluble polyvalent metal salt, it is meant herein a water-soluble polyvalent metal salt, for example calcium. Examples of such a compound include: calcium nitrate ($Ca(NO_3)_2$), calcium chloride ($CaCl_2$), calcium hydroxide ($Ca(OH)_2$) and calcium acetate ($Ca(CH_3COO)_2$). In some examples, the water-soluble polyvalent metal salt is calcium nitrate.

The fixer fluid composition can include a polyvalent metal salt consisting of calcium propionate and calcium nitrate. The calcium propionate may be present in an amount ranging from 0 wt. % to about 3 wt. % based on a total wt. % of the fixer fluid composition, while the calcium nitrate may be present in an amount ranging from about 0 wt. % to about 10 wt. % based on the total wt. % of the fixer fluid composition.

Liquid Vehicle

In one example, the fixer fluid composition comprises a liquid vehicle. The liquid vehicle may be an aqueous liquid vehicle, i.e. it comprises water.

In some examples, the liquid vehicle comprises a solvent other than water or in addition to water. In some examples, the solvent is selected from an aliphatic alcohol, for example a primary aliphatic alcohol, a secondary aliphatic alcohol or a tertiary aliphatic alcohol. The aliphatic alcohol may be a diol. In some examples, the solvent is an aliphatic alcohol containing 10 carbons or less, for example 8 carbons or less, or 6 carbons or less. In some examples, the solvent is an aliphatic alcohol being a diol containing 10 carbons or less, for example 8 carbons or less or 6 carbons or less.

In some examples, the solvent is selected from the group comprising 1,2-propanediol, 1,2-butanediol, ethylene glycol, tetraethylene glycol, 2-methyl-2,4-pentanediol, 1,3-butanediol, 2-methyl-1,3-propanediol and 1,3-propanediol. In some examples, the solvent is selected from the group comprising 1,2-propanediol, 1,2-butanediol, ethylene glycol, tetraethylene glycol, 2-methyl-2,4-pentanediol and 1,3-butanediol. In some examples, the solvent is selected from the group comprising 1,2-propanediol, 1,2-butanediol, ethylene glycol, tetraethylene glycol, 2-methyl-2,4-pentanediol, 1,3-butanediol, 2-methyl-1,3-propanediol and 1,3-propanediol. In some examples, the solvent is selected from the group comprising 1,2-propanediol, 1,2-butanediol, ethylene glycol, tetraethylene glycol, 2-methyl-2,4-pentanediol and 1,3-butanediol. In some examples, the solvent is tetraethylene glycol.

In some examples, the fixer fluid composition comprises at least about 2 wt. % of the solvent by total weight of the composition, for example at least about 10 wt. %, or at least about 15 wt. % by total weight of the composition.

In some examples, the fixer fluid composition comprises less than about 40 wt. % of the solvent by total weight of the composition, for example less than about 30 wt. %, or less than about 20 wt. % by total weight of the composition.

In some examples, the fixer fluid composition comprises the solvent in an amount of from about 2 wt. % to about 40 wt. % by total weight of the composition, for example from about 5 wt. % to about 30 wt. %, about 7 wt. % to about 20 wt. %, or from about 8 wt. % to about 15 wt. % by total weight of the composition.

In some examples, the fixer fluid composition has a pH of less than about 7, for example a pH of less than about 6, for example a pH of less than about 5, for example a pH of less than about 4, for example a pH of less than about 3, for example a pH of less than about 2, for example a pH of about 1.5.

In some examples, the fixer fluid composition has a pH of greater than about 1.5, for example a pH of greater than about 2, for example a pH of greater than about 3, for example a pH of greater than about 4, for example a pH of greater than about 5, for example a pH of greater than about 6, for example a pH of about 7. In some examples, the fixer fluid composition has a pH in the range of from 6 to 7. Any number of commonly known buffers may be used to establish a desired pH level in the inkjet system. In one example, the fixer fluid composition comprises a Tris-based buffer. In one example, the pH of the fixer fluid composition is adjusted using aqueous potassium hydroxide.

The fixer fluid composition may also include one or more surfactants. The surfactant may be present to lower surface tension. As an example, the ink may include non-ionic, cationic, and/or anionic surfactants, which may be present in an amount ranging from about 0.01 to 5 wt. % based on the total concentration of the fixer fluid composition. In some examples, the surfactant may be a non-ionic surfactant, such as a silicone-free alkoxylated alcohol surfactant such as, for example, Surfynol® SE-F or Surfynol CT-211 (Evonik Industries), present in an amount of about 0.01 to 1 wt. % of the total fixer fluid composition, for example, present in an amount of about 0.1 wt. %. Other suitable surfactants include non-ionic fluorosurfactants, including those available from DuPont™ such as Capstone® FS-35, FS-34, FS-65 and the Zonyl® range of fluorosurfactants such as FSO-100.

The fixer fluid composition may also include one or more additives as described herein in connection with the over-print varnish formulation.

Ink Composition

The method of printing described herein may comprise applying an ink composition onto a fixer fluid composition on a substrate. The method may be a method of inkjet printing and may comprise jetting an ink composition. In some examples, the method may comprise printing an ink composition comprising a polymer. In some examples, the method may comprise printing an ink composition comprising a latex polymer. In some examples, the method of inkjet printing may comprise printing an ink composition other than a latex ink composition, for example a water-based ink composition comprising a polyurethane dispersion or other water-soluble polymers.

In some examples, the ink composition is a liquid thermal inkjet ink composition comprising a colourant dispersed in an ink vehicle. In some examples, the ink vehicle can be an aqueous vehicle. The term aqueous vehicle can refer to water or a mixture of water and at least one water-soluble or partially water-soluble organic solvent.

Latex Ink Composition

Latex polymers are used in ink compositions and can be prepared using any of a number of methods known in the art, including but not limited to emulsion polymerisation techniques where co-monomers are dispersed and polymerised in a discontinuous phase of an emulsion. The latexes can also be dispersions of polymer prepared by other techniques known to those in the art.

The monomers used in the latexes can be vinyl monomers. In some examples, the monomers from which the latex polymer is formed are selected from vinyl monomers, acrylate monomers, methacrylate monomers, styrene monomers, ethylene monomers, vinyl chloride, vinylidene chloride, maleate esters, fumarate esters, itaconate esters and combinations thereof. In some examples, monomers from which the latex polymer is formed may comprise ethyl acrylate; ethyl methacrylate; benzyl acrylate; benzyl methacrylate; propyl acrylate; propyl methacrylate; iso-propyl acrylate; iso-propyl methacrylate; butyl acrylate; butyl methacrylate; hexyl acrylate; hexyl methacrylate; octadecyl methacrylate; octadecyl acrylate; lauryl methacrylate; lauryl acrylate; hydroxyethyl acrylate; hydroxyethyl methacrylate; hydroxyhexyl acrylate; hydroxyhexyl methacrylate; hydroxyoctadecyl acrylate; hydroxyoctadecyl methacrylate; hydroxylauryl methacrylate; hydroxylauryl acrylate; phenethyl acrylate; phenethyl methacrylate; 6-phenylhexyl acrylate; 6-phenylhexyl methacrylate; phenyllauryl acrylate; phenyllauryl methacrylate; 3-nitrophenyl-6-hexyl methacrylate; 3-nitrophenyl-18-octadecyl acrylate; ethyleneglycol dicyclopentyl ether acrylate; vinyl ethyl ketone; vinyl propyl ketone; vinyl hexyl ketone; vinyl octyl ketone; vinyl butyl ketone; cyclohexyl acrylate; methoxysilane; acryloxypropylmethyldimethoxysilane; trifluoromethyl styrene; trifluoromethyl acrylate; trifluoromethyl methacrylate; tetrafluoropropyl acrylate; tetrafluoropropyl methacrylate; heptafluorobutyl methacrylate; iso-butyl acrylate; iso-butyl methacrylate; 2-ethylhexyl acrylate; 2-ethylhexyl methacrylate; iso-octyl acrylate; iso-octyl methacrylate; and combinations thereof.

In some examples, the latex polymer is formed from monomers selected from styrenes, $C_1$ to $C_8$ alkyl methacrylates, $C_1$ to $C_8$ alkyl acrylates, ethylene glycol methacrylates and dimethacrylates, methacrylic acids, acrylic acids, and combinations thereof. Examples of latex polymers that can be used include those prepared using a monomer emulsion of methyl methacrylate, butyl acrylate, cyclohexyl methacrylate and methacrylic acid, which are copolymerised to form the latex.

In some examples the monomers from which the latex polymer is formed include acid monomers, such as (meth) acrylic acid monomers. Acidic monomers that can be polymerised in forming latexes include, without limitation, acrylic acid, methacrylic acid, ethacrylic acid, dimethylacrylic acid, maleic anhydride, maleic acid, vinylsulphonate, cyanoacrylic acid, vinylacetic acid, allylacetic acid, ethylidineacetic acid, propylidineacetic acid, crotonic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, vinylbenzoic acid, N-vinylsuccinamidic acid, mesaconic acid, methacroylalanine, acryloylhydroxyglycine, sulphoethyl methacrylic acid, sulphopropyl acrylic acid, styrene sulphonic acid, sulphoethylacrylic acid, 2-methacryloyloxymethane-1-sulphonic acid, 3-methacryloyloxypropane-1-sulphonic acid, 3-(vinyloxy)propane-1-sulphonic acid, ethylenesulphonic acid, vinyl phosphoric acid, vinyl benzoic acid, 2-acrylamido-2-methyl-1-propanesulphonic acid, combinations thereof, derivatives thereof, and mixtures thereof.

In some examples, the latex polymer comprises a (meth) acrylate polymer or copolymer. In some examples, the latex polymer comprises a (meth)acrylate copolymer. For example, the latex polymer may comprise a copolymer of a (meth)acrylate monomer and another vinyl monomer, for example another vinyl monomer selected from styrenes, $C_1$ to $C_8$ alkyl methacrylates, $C_1$ to $C_8$ alkyl acrylates, ethylene glycol methacrylates and dimethacrylates, methacrylic acids, acrylic acids, and combinations thereof.

In some examples, the latex polymer comprises a (meth) acrylate polymer being a polymer comprising (meth)acrylate monomers or a (meth)acrylate copolymer being a copolymer comprising (meth)acrylate monomers. In some examples, the latex polymer comprises a (meth)acrylate copolymer comprising (meth)acrylate monomers. In some examples, the (meth)acrylate copolymer comprises (meth) acrylate monomers and vinyl monomers selected from styrenes, $C_1$ to $C_8$ alkyl methacrylates, $C_1$ to $C_8$ alkyl acrylates, ethylene glycol methacrylates and dimethacrylates, methacrylic acids, acrylic acids, and combinations thereof.

In some examples, the (meth)acrylate monomers are selected from aliphatic (meth)acrylate monomers, aromatic (meth)acrylate monomers and combinations thereof.

In some examples, aliphatic (meth)acrylate monomers comprise linear aliphatic (meth)acrylate monomers and/or cycloaliphatic (meth)acrylate monomers.

In some examples, linear (meth)acrylate monomers comprise alkyl (meth)acrylate monomers (for example $C_1$ to $C_8$ alkyl (meth)acrylate monomers). In some examples, the linear (meth)acrylate monomers comprise alkyl methacrylate monomers (e.g. $C_1$ to $C_8$ alkyl methacrylate monomers). In some examples, the linear (meth)acrylate monomers comprise alkyl methacrylate monomers (e.g. $C_1$ to $C_8$ alkyl (meth)acrylate monomers) and alkyl acrylate monomers ($C_1$ to $C_8$ alkyl acrylate monomers).

In some examples, the latex polymer comprises a copolymer comprising alkyl (meth)acrylate (e.g. $C_1$ to $C_8$ alkyl (meth)acrylate monomers) and styrene monomers. In some examples, the latex polymer comprises a copolymer comprising alkyl (meth)acrylate (e.g. $C_1$ to $C_8$ alkyl (meth) acrylate monomers), cyclohexyl methacrylate monomers and (meth)acrylic acid monomers.

In some examples, the latex inkjet ink composition comprises up to about 35 wt. % latex polymer by total weight of the inkjet ink composition. In some examples, the latex inkjet ink composition comprises up to about 30 wt. % latex polymer by total weight of the inkjet ink composition. In some examples, the latex inkjet ink composition comprises up to about 25 wt. % latex polymer by total weight of the inkjet ink composition.

In some examples, the inkjet ink composition comprises at least about 1 wt. % latex polymer by total weight of the inkjet ink composition. In some examples, the latex inkjet ink composition comprises at least about 2 wt. % latex polymer by total weight of the inkjet ink composition. In some examples, the latex inkjet ink composition comprises at least about 5 wt. % latex polymer by total weight of the inkjet ink composition. In some examples, the latex inkjet ink composition comprises at least about 10 wt. % latex polymer by total weight of the inkjet ink composition.

In some examples, the latex inkjet ink composition comprises from about 1 wt. % to about 35 wt. % latex polymer by total weight of the inkjet ink composition. In some examples, the latex inkjet ink composition comprises from about 2 wt. % to about 30 wt. % latex polymer by total weight of the inkjet ink composition. In some examples, the latex inkjet ink composition comprises from about 5 wt. % to about 25 wt. % latex polymer by total weight of the inkjet ink composition.

Pigment

In some examples, the ink composition comprises a pigment. For example, the inkjet ink composition may comprise a polymer, a pigment; and an ink vehicle.

The term "pigment" can include particular dispersible colourants that can be suspended or dispersed in a liquid vehicle in accordance with embodiments of the present invention. Irrespective of other pigments that may be present, at least one pigment type that must be present is a polymer-attached pigment. "Polymer-attached pigments" include pigments having a polymer covalently attached to the surface of the pigment, a polymer adsorbed or grafted onto the surface of the pigment, or a pigment at least partially encapsulated by a polymer. The pigment itself can be a self-dispersed pigment or a non self-dispersed pigment. Self-dispersed pigments include those that have been chemically surface modified with a charge or a polymeric grouping. This chemical modification aids the pigment in becoming and/or substantially remaining dispersed in a liquid vehicle. When a polymeric grouping provides the surface modification, then it is considered to be a polymer-attached pigment without further modification, though further modification is not precluded. The pigment used to form the polymer-attached pigment can also be a non self-dispersed pigment that utilises a separate and unattached dispersing agent (which can be a polymer, an oligomer, or a surfactant, for example) in the liquid vehicle or physically coated on the surface of the pigment.

The pigment may include black pigments, white pigments, cyan pigments, magenta pigments, yellow pigments, or the like. Suitable inorganic pigments include, for example, carbon black. However, other inorganic pigments may be suitable such as titanium oxide, cobalt blue (CoO—$Al_2O_3$), chrome yellow ($PbCrO_4$), and iron oxide. Suitable organic pigments include, for example, azo pigments including diazo pigments and monoazo pigments, polycyclic pigments (e.g. phthalocyanine pigments such a phthalocyanine clue and phthalocyanine greens, perylene pigments, perynone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitropigments, nitroso pigments, and the like. Representative examples of phthalocyanine blues include copper phthalocyanine blue and derivatives thereof (Pigment Blue 15). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194 (Perinone Red), Pigment Red 216 (Brominated Pyranthrone Red) and Pigment Red 226 (Pyranthrone Red). Representative examples of perylenes include Pigment Red 123 (Vermillion), Pigment Red 149 (Scarlet), Pigment Red 179 (Maroon), Pigment Red 190 (Red), Pigment Violet 19, Pigment Red 189 (Yellow Shade Red) and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 151, Pigment Yellow 117, Pigment Yellow 128 and Pigment Yellow 138, Pigment Yellow 155, Pigment Yellow 83, and Pigment Yellow 213. Such pigments are commercially available in either powder or press cake form from a number of sources including, BASF™ Corporation, Engelhard™ Corporation and Sun Chemical™ Corporation.

Examples of black pigments that can be used include carbon pigments. The carbon pigment can be almost any commercially available carbon pigment that provides acceptable optical density and print characteristics. Carbon pigments suitable for use in the present system and method include, without limitation, carbon black, graphite, vitreous carbon, charcoal, and combinations thereof. Such carbon pigments can be manufactured by a variety of known methods such as a channel method, a contact method, a furnace method, an acetylene method, or a thermal method, and are commercially available from such vendors as Cabot™ Corporation, Columbian Chemicals Company, Degussa AG™, and E.I. DuPont™ de Nemours and Company. Suitable carbon black pigments include, without limitation, Cabot pigments such as MONARCH™ 1400, MONARCH™ 1300, MONARCH™ 1100, MONARCH™ 1000, MONARCH™ 900, MONARCH™ 880, MONARCH™ 800, MONARCH™ 700, CAB-O-JET™ 200, CAB-O-JET™ 300, REGAL, BLACK PEARLS™, ELFTEX™, MOGUL™, and VULCAN™ pigments; Columbian pigments such as RAVEN™ 7000, RAVEN™ 5750, RAVEN™ 5250, RAVEN™ 5000, and RAVEN™ 3500; Degussa pigments such as Color Black FW 200, RAVEN™ FW 2, RAVEN™ FW 2V, RAVEN™ FW 1, RAVEN™ FW 18, RAVEN™ S160, RAVEN™ FW S170, Special Black™ 6, Special Black™ 5, Special Black™ 4A, Special Black™ 4, PRINTEX™ U, PRINTEX™ 140U, PRINTEX™ V and PRINTEX™ 140V; and TIPURE™ R-101 available from DuPont™. The above list of pigments includes unmodified pigment particulates, small molecule attached pigment particulates, and polymer-dispersed pigment particulates.

Similarly, a wide variety of coloured pigments can be used with the inkjet ink composition, therefore the following listing is not intended to be limiting. For example, coloured pigments can be blue, brown, cyan, green, white, violet, magenta, red, orange, yellow, as well as mixtures thereof. The following colour dispersions are available from Cabot™ Corp.: CABO-JET™ 250C, CABO-JET™ 260M, and CABO-JET™ 270Y. The following colour pigments are available from BASF™ Corp.: PALIOGEN™ Orange, PALIOGEN™ Orange 3040, PALIOGEN™ Blue L 6470, PALIOGEN™ Violet 5100, PALIOGEN™ Violet 5890, PALIOGEN™ Yellow 1520, PALIOGEN™ Yellow 1560, PALIOGEN™ Red 3871K, PALIOGEN™ Red 3340, HELIOGEN™ Blue 6901F, HELIOGEN™ Blue NBD 7010, HELIOGEN™ Blue K 7090, HELIOGEN™ Blue L 7101F, HELIOGEN™ Blue L6900, L7020, HELIOGEN™ Blue D6840, HELIOGEN™ Blue D7080, HELIOGEN™ Green L8730, HELIOGEN™ Green K 8683, and HELIOGEN™ Green L 9140. The following pigments are available from Ciba-Geigy Corp.: CHROMOPHTAL™ Yellow 3G, CHROMOPHTAL™ Yellow GR, CHROMOPHTAL™ Yellow 8G, IGRAZIN™ Yellow SGT, IGRALITE™ Rubine 4BL, IGRALITE™ Blue BCA, MONASTRAL™ Magenta, MONASTRAL™ Scarlet, MONASTRAL™ Violet R, MONASTRAL™ Red B, and MONASTRAL™ Violet Maroon B. The following pigments are available from Heubach Group™: DALAMAR™ Yellow YT-858-D and HEUCOPHTHAL™ Blue G XBT-583D. The following pigments are available from Hoechst Specialty Chemicals™: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, NOVOPERM™ Yellow HR, NOVOPERM™ Yellow FGL, Hansa Brilliant Yellow 10GX, Permanent Yellow G3R-01, HOSTAPERM™ Yellow H4G, HOSTAPERM™ Yellow H3G, HOSTAPERM™ Orange GR, HOSTAPERM™ Scarlet GO, HOSTAPERM™ Pink E, Permanent Rubine F6B, and the HOSTAFINE™ series. The following pigments are available from Mobay Corp.: QUINDO™ Magenta, INDOFAST™ Brilliant Scarlet, QUINDO™ Red R6700, QUINDO™ Red R6713, and INDOFAST™ Violet. The following pigments are available from Sun Chemical Corp.: L74-1357 Yellow, L75-1331 Yellow, and L75-2577 Yellow. Other examples of pigments can include Normandy Magenta RD-2400, Permanent Violet VT2645, Argyle Green XP-111-S, Brilliant Green Toner GR 0991, Sudan Blue OS, PV Fast Blue B2GO1, Sudan III, Sudan II, Sudan IV, Sudan Orange G, Sudan Orange 220, Ortho Orange OR 2673, Lithol Fast Yellow 0991 K, Paliotol Yellow 1840, Lumogen Yellow D0790, Suco-Gelb L1250, Suco-Yellow D1355, Fanal Pink D4830, Cinquasia Magenta, Lithol Scarlet D3700, Toluidine Red, Scarlet for Thermoplast NSD PS PA, E. D. Toluidine Red, Lithol Rubine Toner, Lithol Scarlet 4440, Bon Red C, Royal Brilliant Red RD-8192, Oracet Pink RF, Lithol Fast Scarlet L4300, and white TIPURE R-101. These pigments are available from commercial sources such as Hoechst Celanese Corporation™, Paul Uhlich, BASF, American Hoechst™, Ciba-Geigy™, Aldrich™ DuPont™, Ugine Kuhlman of Canada™, Dominion Color Company™, Magruder™, and Matheson™. Examples of other suitable coloured pigments are described in the Colour Index, 3$^{rd}$ edition (The Society of Dyers and Colourists, 1982).

In some examples, the inkjet ink composition comprises an ink vehicle. In some examples, the ink vehicle comprises water, i.e. is an aqueous ink vehicle.

In some examples, the ink vehicle may include a variety of different agents, including without limitation, surfactants, co-solvents, buffers, biocides, viscosity modifiers, sequestering agents, stabilising agents, and water.

In one example, the ink vehicle includes water as the base solvent and so is termed an aqueous ink vehicle.

Co-Solvent

In one example, the ink vehicle also includes one or more co-solvents. Classes of co-solvents that can be used can include organic co-solvents including aliphatic alcohols, aromatic alcohols, diols, glycol ethers, polyglycol ethers, 2-pyrrolidinones, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologues ($C_6$-$C_{12}$) of polyethylene glycol ethers, N-alkyl caprolactams, unsubstituted caprolactams, both substituted and unsubstituted formamides, both substituted and unsubstituted acetamides, and the like.

In one example, the ink vehicle includes one or more aliphatic alcohols as co-solvents in an amount of at least about 4 wt. % of the total weight of the ink composition, for example at least about 5 wt. %, for example at least about 6 wt. %, for example at least about 7 wt. %, for example at least about 8 wt. %, for example at least about 9 wt. %, for example at least about 10 wt. %, for example at least about 12 wt. %, for example at least about 14 wt. %, for example at least about 16 wt. %, for example at least about 18 wt. %, for example at least about 20 wt. %, for example at least about 25 wt. %, for example at least about 30 wt. %, for example at least about 35 wt. %, for example at least about 40 wt. %.

In one example, the ink vehicle includes one or more aliphatic alcohols as co-solvents in an amount of less than about 40 wt. % of the total weight of the ink composition, for example less than about 35 wt. %, for example less than about 30 wt. %, for example less than about 25 wt. %, for example less than about 20 wt. %, for example less than about 18 wt. %, for example less than about 16 wt. %, for example less than about 14 wt. %, for example less than about 12 wt. %, for example less than about 10 wt. %, for example less than about 9 wt. %, for example less than about 8 wt. %, for example less than about 7 wt. %, for example less than about 6 wt. %, for example less than about 5 wt. %, for example about 4 wt. %.

In one example, the ink vehicle includes butanediol, for example 1,2-butanediol as co-solvent in an amount of at least 4 wt. % of the total weight of the ink composition. In one example, the ink vehicle comprises butanediol, for example 1,2-butanediol, in the amounts stated in the preceding paragraphs.

In one example, the ink vehicle includes one or more glycol ethers as co-solvents. In one example, the ink vehicle includes one or more glycol ethers as co-solvents in an amount of at least about 0.05 wt. % of the total of the ink composition, for example at least about 0.1 wt. %, for example at least about 0.5 wt. %, for example at least about 1 wt. %, for example at least about 1.5 wt. %, for example at least about 2 wt. %, for example at least about 2.5 wt. %, for example at least about 3 wt. %, for example at least about 3.5 wt. %, for example at least about 4 wt. %, for example at least about 4.5 wt. %, for example at least about 5 wt. %.

In one example the ink vehicle includes one or more glycol ethers as co-solvents in an amount of less than about 5 wt. % of the total weight of the ink composition, for example less than about 4.5 wt. %, for example less than about 4 wt. %, for example less than about 3.5 wt. %, for example less than about 3 wt. %, for example less than about 2.5 wt. %, for example less than about 2 wt. %, for example less than about 1.5 wt. %, for example less than about 1 wt. %, for example less than about 0.5 wt. %, for example less than about 0.1 wt. %, for example less than about 0.05 wt. %.

Suitable glycol ethers include ethylene glycol monomethyl ether, ethylene glycol monoethyl ether, ethylene glycol monopropyl ether, ethylene glycol monoisopropyl ether, ethylene glycol monobutyl ether, ethylene glycol monophenyl ether, ethylene glycol monobenzyl ether, diethylene glycol monoethyl ether, diethylene glycol mono-n-butyl ether, tripropylene glycol methyl ether, available from Dow or Sigma-Aldrich. In one example, the ink vehicle comprises tripropylene glycol methyl ether in the amounts stated in the preceding paragraphs.

Additives

In one example, the inkjet ink composition may include a wax. Wax emulsions are commercially available from a number of vendors, for example Keim-Additec™ Lubrizol™, Michelman™, and BYK Chemie™. Wax emulsions that are useful include but are not limited to: Lubrizol™: Liquilube™ 411, Liquilube™ 405, Liquilube™ 488, Liquilube™ 443, Liquilube™ 454; Michelman: ME80825, ME48040, ME98040M1, ME61335, ME90842, ME91240, ML160; Keim-Additec: Ultralube® E-521/20, Ultralube® E-7093, Ultralube® 7095/1, Ultralube® E-8046, Ultralube® E-502V, Ultralube® E-842N; Byk: Aquacer® 2650, Aquacer® 507, Aquacer® 533, Aquacer® 515, Aquacer® 537, Aquaslip™ 671, Aquaslip™ 942.

In one example, the wax can have a melting point ranging from 60° C. to 110° C. Generally, the wax can have a particle size ranging from 50 nm to 600 nm. In one example, the wax can have a particle size ranging from 200 nm to 300 nm. Generally, the wax can be present in the ink at a concentration ranging from 0.25 wt. % to 5 wt. %. In one example, the wax can be present ranging from 0.5 wt. % to 1.5 wt. %. Additionally, the wax emulsions can be compatible with high acid acrylic dispersants and hydrocolloids. By compatible, the present waxes can be used without causing aggregation or precipitation of the dispersants/hydrocolloids particularly over extended periods of time (weeks/months at ambient temperature or days/weeks at elevated temperature such as 40° C. to 65° C.). Incompatibility can manifest itself variously by increases in wax particle size, phase separation of wax, or creaming at a faster rate than in the absence of destabilising materials.

In one example, the inkjet ink composition may further comprise one or more surfactants. In one example, one or more non-ionic, cationic, and/or anionic surfactants can be present in the inkjet ink composition described, ranging from 0.01 wt. % to 10 wt. %. Non-limiting examples of such surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, substituted amine oxides, polyethylene oxide alkyl sulphonates, polyethylene oxide alkyl sulphates, polyethylene oxide alkyl phosphates, and the like, as well as fluorocarbon and silicone surfactants. In one example, the present inkjet inks can include alkyl ethoxylate surfactants. Such surfactant can include, but are not limited to, TERGITOL® 15-S-7, TERGITOL® 15-S-9, TERGITOL® TMN-6 90 percent, and NEODOL® 91-6. In one example, the one or more surfactants can have an HLB value ranging from about 12 to about 13.5. As used herein, "HLB" refers to hydrophile-lipophile-balance which is a measure of the balance or proportion of hydrophilic to lipophilic portions of a molecule. In another example, the one or more surfactants can each be present in the inkjet ink at a concentration ranging from about 0.01 wt. % to about 0.5 wt. %.

Various other additives may be employed to enhance the properties of the inkjet ink composition for specific application. Examples of these additives are those added to inhibit the growth of harmful microorganisms. These additives may be biocides, fungicides, and other microbial agents, which are routinely used in ink formulations. Examples of suitable microbial agents include but are not limited to, NUOSEPT® (Nudex™, Inc.), UCARCIDE™ (Union Carbide™ Corp.), VANCIDE® (R.T. Vanderbilt™ Co.), PROXEL® (ICI™ America), and combinations thereof.

In some examples, the ink composition has a surface tension in the range of about 20-40 dynes/cm, where the surface tension is measured at the jetting temperature (i.e. the temperature at which the composition is to be jetted). In some examples, the jetting temperature is a temperature in the range of about 10° C. to about 50° C., for example about 20-40° C., or about 25° C. In some examples, the ink composition has a surface tension of at least about 15 dynes/cm at 25° C., for example at least about 20 dynes/cm at 25° C. In some examples, the varnish composition has a surface tension of up to about 50 dynes/cm at 25° C., for example up to about 45 dynes/cm at 25° C., or up to about 40 dynes/cm at 25° C. In some examples, the varnish formulation has a surface tension in the range of about 20 to about 40 dynes/cm at 25° C.

In some examples, the surface tension of the ink composition and the surface tension of the varnish composition are both in the range of about 20-40 dynes/cm, where the surface tension is measured at the jetting temperature (i.e. the temperature at which the composition is to be jetted). In some examples, the jetting temperature is a temperature in the range of about 10° C. to about 50° C., for example about 20-40° C., or about 25° C.

In some examples, the ink composition and the varnish formulation both have a surface tension of at least about 15 dynes/cm at 25° C., for example at least about 20 dynes/cm at 25° C. In some examples, the ink composition and the varnish formulation both have a surface tension of up to about 50 dynes/cm at 25° C., for example up to about 45 dynes/cm at 25° C., or up to about 40 dynes/cm at 25° C. In some examples, the varnish formulation has a surface tension in the range of about 20 to about 40 dynes/cm at 25° C.

Printed Article

Described herein is a printed article, comprising: a substrate; a fixer composition disposed on the substrate, an ink composition disposed on the fixer composition; and an over-print varnish formulation disposed on the ink composition, wherein the over-print varnish formulation comprises: a non-ionic polyurethane dispersion; a water-soluble polymer of $M_w$ less than 55,000; a wax having a particle size ($d_{50}$) 200 nm or less.

The fixer composition, the ink composition and the over-print varnish formulation may be as described herein.

In some examples, the substrate is a porous substrate, for example paper, cardboard, for example corrugated cardboard or a polyester textile. The nature of the substrate will depend on the end use of the printed article, i.e. the user requirements.

EXAMPLES

The following illustrates examples of the compositions and related aspects described herein. Thus, these examples should not be considered to restrict the present disclosure but are merely in place to teach how to make examples of compositions of the present disclosure.

A series of water-based over-print varnish compositions for digital application as shown in Table 1 were formulated, with the aim of providing durable printed images with high gloss and print quality from a wet-on-wet application method, including good bleed, coalescence, jetting stability and robustness.

TABLE 1

| Formulation No. | Non-ionic PUD (40% solids) Joncryl FLX 5201 (wt. %) | Water-soluble polymer (100% solids) PVP K-30 (wt. %) | Surfactant (100% solids) BYK 348 (wt. %) | Surfactant (100% solids) Surfynol 440 (wt. %) | Surface tension (dynes/cm) |
|---|---|---|---|---|---|
| 1 (low surface tension) | 42.5 | 2 | 0.9 | 0.9 | 27 |
| 2 (intermediate surface tension) | 42.5 | 2 | 0.3 | 0.3 | 31 |
| 3 (high surface tension) | 42.5 | 2 | 0.06 | 0.06 | 34.7 |

The following components completed the content of each formulation:

TABLE 2

| Formulation component | Dipropylenglycol | Joncryl Wax 35 | Water | Total solids of each formulation |
|---|---|---|---|---|
| % solids | 100 | 35 | | 21 |
| Role in formulation | Solvent-humectant | Polyethylene wax dispersion | Liquid vehicle | |
| wt. % in formulation | 15 | 5.7 | Balance | |

A fixer fluid composition in accordance with Table 3 was printed using a Godzilla thermal inkjet pen onto corrugated media (coated media: Pro WKL (Kemi art) Lite+, uncoated media: Royal 2000 CDP). Black ink CV150, used in C500 industrial press, was printed also using a Godzilla thermal inkjet pen onto the fixer composition. Each water-based over-print varnish composition was printed using a piezo-electric inkjet head by Ricoh-MH2810F onto Black ink CV150. Fluid was recirculating through the print head by ink delivery system Megnajet CIMS 2 HFR at a flow rate of 20 ml/minute. Finally, the prints were dried using an IR dryer unit.

TABLE 3

| Fluid | % |
|---|---|
| Calcium Propionate | 2.8 |
| Calcium Nitrate Tetrahydrate | 8 |
| Surfynol CT-211 = Carbowet GA211 | 0.02 |
| Surfynol SEF | 0.045 |
| tetraethylene glycol | 12.00 |
| Acticide B20 | 0.20 |
| Acticide M20 | 0.07 |
| Tiron (CAS#149-45-1) | 0.095 |
| Water | balance |

When testing the wet-on-dry application of the over-print varnish composition, the drying step of the printed article was introduced immediately before application of the over-print varnish composition. At first optimal jetting parameters were set by strobe testing with Ricoh evaluation kit, then the fluid was printed on the lab printer (Corgi) and finally prints were evaluated and compared.

The durability of the prints was tested using the Sutherland 2000 rub tester. Media prints were positioned under 4 libra weight with Melotex media attached. The prints were rubbed by the weight a certain amount of cycles according to the media type (500 cycles on coated media and 100 cycles on uncoated media). Prints after the test were graded from 1 to 5, where 1 is the worst (sample is very damaged) and 5 is the best (no noticeable damage). The gloss of the prints was measured using a Micro-gloss 75° by Gardner. The gloss was tested along the direction of print. The coalescence of the prints of different testing conditions was evaluated qualitatively using a proprietary automated image analysis to evaluate coalescence independently of granularity.

The results of these tests for the above formulations (Nos. 1-3) can be seen below compared to the reference composition from patent application #WO 2018/193289:

TABLE 4

| | Formulation 1 | |
|---|---|---|
| Test | Wet-on-wet application | Wet-on-dry application |
| Durability | Grade 4 | Grade 4 |
| Decap | 30 minutes (1000 drops/nozzle) | 30 minutes (1000 drops/nozzle) |
| Gloss 75° (GU = gloss unit) | 52 GU on black | 65 GU on black |
| Coalescence | 4.6 on black | 2.8 on black |

TABLE 5

| | Formulation 2 | |
|---|---|---|
| Test | Wet-on-wet application | Wet-on-dry application |
| Durability | Grade 4 | Grade 4 |
| Decap | 30 minutes (1000 drops/nozzle) | 30 minutes (1000 drops/nozzle) |
| Gloss 75° (GU = gloss unit) | 54 GU on black | 61 GU on black |
| Coalescence | 4.6 on black | 3 on black |

TABLE 6

| | Formulation 3 | |
|---|---|---|
| Test | Wet-on-wet application | Wet-on-dry application |
| Durability | Grade 4 | Grade 4 |
| Decap | 30 minutes (1000 drops/nozzle) | 30 minutes (1000 drops/nozzle) |
| Gloss 75° (GU = gloss unit) | 57 GU on black | 59 GU on black |
| Coalescence | 4.6 on black | 3.2 on black |

TABLE 7

Reference latex-based over-print formulation

| Test | Wet-on-wet application | Wet-on-dry application |
|---|---|---|
| Durability | Grade 3 | Grade 5 |
| Decap | 2 hours (1000 drops/nozzle) | 2 hours (1000 drops/nozzle) |
| Gloss 75° (GU = gloss unit) | 37 GU on black | 60 GU on black |
| Coalescence | 4.2 on black | 4.4 on black |

As can be seen from Table 5, the reference formulation performs unacceptably in a wet-on-wet application method. However, Formulations 1-3 all demonstrate much improved durability and gloss and comparable coalescence (Tables 4-6).

Comparing each individual formulation now, it can be seen that each performs equally as well as the other except that Formulation 2 has improved gloss over Formulation 1 and Formulation 3 has improved gloss over Formulation 2. This can be attributed to the increase in surface tension moving from Formulation 1 to 2 and from 2 to 3 which is achieved through the reduction in surfactant content.

Subsequently, the present inventors have found that aligning the surface tension of the over-print varnish formulation with that of the ink on which it is to be printed, also affords an improved gloss of the resultant printed article and indeed comparable performance to that of the same formulation in a wet-on-dry application method.

Strobe testing was used to optimise the jetting performance of the formulations. The Ricoh evaluation kit was used which consists of a bracket to hold the print head, an LED source of illumination and a camera. The LED light is synchronised with the fire pulse. The camera enables viewing drops on the flight. Drop velocity is calculated by software according to the standard method of the distance that drop travels in a defined time (V=X/t), for example, if the drop passes a 1000-micron distance in 100 microseconds, the drop velocity equals 10 [m/sec].

The following strobe tests were used.

The pulse width optimisation involves changing the duration of the pulse to find the highest drop velocity.

The drop velocity vs voltage finds a suitable voltage for 10 [m/sec] jetting.

The velocity to frequency response measures the velocity to frequency between 1-30 [KHz].

The drop weight is measured when jetting at 10 [m/sec] at the relevant frequency 15-25 [KHz].

Measuring the stability involves jetting all nozzles for 3 minutes, followed by scanning for missing nozzles at initial time (t<30 sec). The number of missing nozzles is MN0. Then wait for 2 minutes and then scan again. The number of missing nozzles on this occasion is MNf. Jetting is considered stable when MNf−MN0=Δ<10.

Cross Talk involves measuring the effect of neighbouring nozzles jetting on the drop velocity. The results are the max percentage of change when comparing to drop velocity of a single nozzle.

The decap test starts with printing a first image and achieving good initial quality printing, where good is no, or only a few, missing nozzles are observed in the printed image (i.e. the lines are complete). Additional prints are made after the print head stays idle during specific time intervals e.g. 10 mins, 30 mins etc. A new initial line is jetted for each time interval. After each time interval, print quality is evaluated by observation; if more than 10 new missing nozzles are noted, the test stops. The formulation then receives a score according to the time interval it lasted. This score defines the "Decap time".

The following results were obtained for each water-based over-print varnish formulation under the above test conditions:

TABLE 8

| Test | Formulations 1-3 | Comments |
|---|---|---|
| Stability | Up to 20[KHz] | Single pulse |
| Drop weight | 27 ng | Drop weight increase with voltage and frequency up to 30 ng |
| Drop velocity | 10 m/sec | At 1 millimetre from nozzle face |
| Decap | 30 minutes | 1000 drops from each nozzle |
| Cross Talk | <10% | |

It can be seen from the above results that despite the modification to the over-print varnish composition the formulations still demonstrate a robust jetting performance.

While the compositions, methods and related aspects have been described with reference to certain examples, it will be appreciated that various modifications, changes, omissions, and substitutions can be made without departing from the spirit of the disclosure. It is intended, therefore, that compositions, methods and related aspects be limited only by the scope of the following claims. Unless otherwise stated, the features of any dependent claim can be combined with the features of any of the other dependent claims, and any other independent claim.

The invention claimed is:

1. An over-print varnish formulation, comprising:
   a non-ionic polyurethane dispersion including a non-ionic polyurethane selected from the group consisting of an aromatic polyether polyurethane, an aliphatic polyether polyurethane, an aromatic polyester polyurethane, an aliphatic polyester polyurethane, an aromatic polycaprolactam polyurethane, an aliphatic polycaprolactam polyurethane, a vinyl-urethane hybrid polymer, an acrylic-urethane hybrid polymer, a co-polymer thereof, and a combination thereof;
   a water-soluble polymer of $M_w$ less than 55,000, wherein the water-soluble polymer is a cationic polymer selected from the group consisting of a quaternary amine, a polyguanidine cationic polymer, a water-soluble cationic dendrimer, a polyallylamine, a poly diallyl dimethyl ammonium chloride, or a polyvinyl pyrrolidone, and combinations thereof;
   a wax having a particle size ($d_{50}$) 200 nm or less; and
   a water-soluble solvent,
   wherein the formulation comprises at least 20 wt % solids, based on the total weight of the formulation.

2. The over-print varnish formulation of claim 1, wherein the non-ionic polyurethane is the aliphatic polyether polyurethane, the aliphatic polyester polyurethane, or the aliphatic polycaprolactam polyurethane.

3. The over-print varnish formulation of claim 1, wherein the non-ionic polyurethane has a $M_w$ of less than 200,000.

4. The over-print varnish formulation of claim 1, wherein the water-soluble polymer is present in an amount of no more than 10 wt % based on the total weight of the formulation.

5. The over-print varnish formulation of claim 1, wherein the wax is present in an amount of no more than 10 wt % based on the total weight of the formulation.

6. The over-print varnish formulation of claim 1, wherein the formulation comprises at least 30 wt % solids, based on the total weight of the formulation.

7. The over-print varnish formulation of claim 1, wherein the water-soluble solvent is selected from the group consisting of ethylene glycol, propylene glycol, dipropylene glycol, and mixtures thereof.

8. A method of printing, comprising:
applying a fixer composition onto a substrate;
applying an ink composition onto the fixer composition; and
applying an over-print varnish formulation onto the ink composition prior to drying the ink composition, wherein the over-print varnish formulation comprises:
a non-ionic polyurethane dispersion including a non-ionic polyurethane selected from the group consisting of an aromatic polyether polyurethane, an aliphatic polyether polyurethane, an aromatic polyester polyurethane, an aliphatic polyester polyurethane, an aromatic polycaprolactam polyurethane, an aliphatic polycaprolactam polyurethane, a vinyl-urethane hybrid polymer, an acrylic-urethane hybrid polymer, a co-polymer thereof, and a combination thereof;
a water-soluble polymer of Mw less than 55,000, wherein the water-soluble polymer is a cationic polymer selected from the group consisting of a quaternary amine, a polyguanidine cationic polymer, a water-soluble cationic dendrimer, a polyallylamine, a poly diallyl dimethyl ammonium chloride, or a polyvinyl pyrrolidone, and combinations thereof;
a wax having a particle size ($d_{50}$) 200 nm or less;
a water-soluble solvent; and
at least 20 wt % solids, based on the total weight of the formulation.

9. The method of claim 8, wherein the method is a wet-on-wet inkjet printing method.

10. The method of claim 8, wherein the ink composition is a thermal inkjet ink composition.

11. The method of claim 8, wherein:
the fixer composition is applied by jetting the fixer composition using an inkjet printer;
the over-print varnish formulation is applied by jetting the over-print varnish formulation using the inkjet printer; or
both.

12. A printed article, comprising:
a substrate;
a fixer composition disposed on the substrate;
an ink composition disposed on the fixer composition; and
an over-print varnish formulation disposed on the ink composition, wherein the over-print varnish formulation comprises:
a non-ionic polyurethane dispersion including a non-ionic polyurethane selected from the group consisting of an aromatic polyether polyurethane, an aliphatic polyether polyurethane, an aromatic polyester polyurethane, an aliphatic polyester polyurethane, an aromatic polycaprolactam polyurethane, an aliphatic polycaprolactam polyurethane, a vinyl-urethane hybrid polymer, an acrylic-urethane hybrid polymer, a co-polymer thereof, and a combination thereof;
a water-soluble polymer of $M_w$ less than 55,000, wherein the water-soluble polymer is a cationic polymer selected from the group consisting of a quaternary amine, a polyquanidine cationic polymer, a water-soluble cationic dendrimer, a polyallylamine, a poly diallyl dimethyl ammonium chloride, or a polyvinyl pyrrolidone, and combinations thereof; and
a wax having a particle size ($d_{50}$) 200 nm or less.

13. The printed article of claim 12, wherein the substrate is porous.

14. The over-print varnish of claim 1, wherein the non-ionic polyurethane further includes an acrylic functional group.

* * * * *